US008758949B2

(12) United States Patent
Pal et al.

(10) Patent No.: US 8,758,949 B2
(45) Date of Patent: Jun. 24, 2014

(54) WASTE TO HYDROGEN CONVERSION PROCESS AND RELATED APPARATUS

(71) Applicant: The Trustees of Boston University, Boston, MA (US)

(72) Inventors: Uday B. Pal, Dover, MA (US); Srikanth Gopalan, Westborough, MA (US)

(73) Assignee: The Trustees of Boston University, Boston, MA (US)

( * ) Notice: Subject to any disclaimer, the term of this patent is extended or adjusted under 35 U.S.C. 154(b) by 0 days.

(21) Appl. No.: 13/632,672

(22) Filed: Oct. 1, 2012

(65) Prior Publication Data

US 2013/0026032 A1 Jan. 31, 2013

Related U.S. Application Data

(63) Continuation-in-part of application No. 11/917,894, filed as application No. PCT/US2006/023570 on Jun. 16, 2006, now abandoned.

(60) Provisional application No. 60/691,007, filed on Jun. 16, 2005, provisional application No. 60/760,906, filed on Jan. 20, 2006.

(51) Int. Cl.
*H01M 8/06* (2006.01)
*H01M 4/36* (2006.01)
*H01M 8/10* (2006.01)
*H01M 4/92* (2006.01)
*C25C 7/00* (2006.01)

(52) U.S. Cl.
USPC ........... 429/408; 429/479; 429/484; 429/487; 204/250; 204/DIG. 4

(58) Field of Classification Search
USPC ......... 429/488, 489, 532, 408, 479, 484, 487; 204/DIG. 4, 250
See application file for complete search history.

(56) References Cited

U.S. PATENT DOCUMENTS 3,562,135 A 2/1971 Marincek
4,108,743 A 8/1978 Minck
(Continued)

FOREIGN PATENT DOCUMENTS

FR 1533262 5/1967
WO WO-03/089117 10/2003
(Continued)

OTHER PUBLICATIONS

A. Krishnan, "Solid Oxide Membrane Cell for Oxide (MgO) Electrolysis and Metal (Mg) Production", Ph.D. Thesis, 2005, Boston University, Boston, MA, 171 pages.

(Continued)

*Primary Examiner* — Patrick Ryan
*Assistant Examiner* — Julian Anthony
(74) *Attorney, Agent, or Firm* — Wilmer Cutler Pickering Hale and Dorr LLP

(57) ABSTRACT

A reversible electrochemical system includes a first electrode comprising liquid silver metal and a second electrode, said first and second electrodes separated by a oxygen ion-conducting solid electrolyte; a conduit for directing a first reactive material across the second electrode; and a conduit for contacting second reactive material with the first liquid silver electrode, wherein the cell is capable of steam electrolysis when the polarity of the electrodes is selected such that the liquid silver is an anode and the cell is capable of electrical energy generation when the polarity of the electrodes is selected such that the liquid silver is a cathode.

21 Claims, 3 Drawing Sheets

(56) References Cited

U.S. PATENT DOCUMENTS

| | | | |
|---|---|---|---|
| 4,608,137 A * | 8/1986 | Vaughan et al. | 205/637 |
| 4,804,448 A | 2/1989 | Sammells et al. | |
| 4,808,448 A | 2/1989 | Cox et al. | |
| 4,865,925 A | 9/1989 | Ludwig et al. | |
| 4,908,113 A | 3/1990 | Marianowski et al. | |
| 5,089,094 A | 2/1992 | Ogasawara et al. | |
| 5,273,628 A | 12/1993 | Liu et al. | |
| 5,306,411 A | 4/1994 | Mazanec et al. | |
| 5,312,525 A | 5/1994 | Pal et al. | |
| 5,380,467 A | 1/1995 | Lin et al. | |
| 5,447,555 A | 9/1995 | Ye et al. | |
| 5,509,362 A | 4/1996 | Lyon | |
| 5,567,286 A | 10/1996 | Pal et al. | |
| 5,962,122 A | 10/1999 | Walpita et al. | |
| 5,976,345 A | 11/1999 | Pal et al. | |
| 6,146,549 A | 11/2000 | Mackay et al. | |
| 6,162,334 A | 12/2000 | Ray et al. | |
| 6,165,553 A | 12/2000 | Chen et al. | |
| 6,296,687 B2 | 10/2001 | Wachsman et al. | |
| 6,471,921 B1 | 10/2002 | Van Calcar et al. | |
| 6,541,159 B1 | 4/2003 | Li et al. | |
| 6,641,626 B2 | 11/2003 | Van Calcar et al. | |
| 6,677,070 B2 | 1/2004 | Kearl | |
| 6,869,722 B2 | 3/2005 | Kearl | |
| 6,896,992 B2 | 5/2005 | Kearl | |
| 2002/0058175 A1 * | 5/2002 | Ruhl | 429/32 |
| 2003/0037488 A1 | 2/2003 | Van Calcar et al. | |
| 2004/0091609 A1 | 5/2004 | Kearl | |
| 2004/0101729 A1 | 5/2004 | Kearl | |
| 2006/0234098 A1 | 10/2006 | Gur | |
| 2007/0111048 A1 | 5/2007 | Rackey et al. | |
| 2008/0107948 A1 * | 5/2008 | Yamanis | 429/33 |

FOREIGN PATENT DOCUMENTS

| | | |
|---|---|---|
| WO | WO-2004/033760 | 4/2004 |
| WO | WO-2006/138611 | 12/2006 |

OTHER PUBLICATIONS

A. Krishnan et al., Pal, "Solid Oxide Membrane (SOM) for Cost Effective and Environmentally Sound Production of Magnesium directly from Magnesium Oxide", Magnesium Technology 2005, TMS Publication 2005, p. 7-15.

A. Krishnan et al., "Solid Oxide Membrane (SOM) Technology for Cost-Effective and Environmentally Sound Production of Metals and Alloys from their Oxide Sources", EPD Congress, TMS Publication, 2005, p. 455-462.

A. Petric et al., "Evaluation of La-Sr-Co-Fe-O Perovskites for Solid Oxide Fuel Cells and Gas Separation Membranes", Solid State Ionics, vol. 135, 2000, p. 719-725.

Herle, et al., "Oxygen diffusion through silver cathodes for solid oxide fuel cells", J. Phys. Chem. Solids, vol. 55, 1994, p. 339-347.

H. Cui et al., "$Gd_{0.2}Ce_{0.8}O_{1.9}$-$Y_{0.08}SR_{0.88}T_{0.95}Al_{0.05}O_{3+0}$ Composte Mixed Conductors for Hydrogen Separation", J. Electrochem Soc., 152, (9), A1726-A1732, (2005).

I. Yasuda et al., "Precise Determination of the Chemical Diffusion Coefficient of Calcium-Doped Lanthanum Chromites by Means of Electrical Conductivity Relaxation", J. Electrochem Soc., 141, No. 5 (1994), p. 1268-1273.

International Search Report and Written Opinion dated Jan. 14, 2008 for PCT/US2006/023570, 4 pages.

J. A. Lane et al., "Oxygen Surface Exchange on Gadolinia Doped Ceria", Solid State Ionics, 136-137, 927 (2000).

J. Crank, The Mathematics of Diffusion, Second Edition, Oxford University Press (1975), 212 pages.

J. Martinez-Frias et al., "A Nature Gas Assisted Steam Electrolyzer for High Efficiency Production of Hydrogen," Intl. J. of Hydrogen Energy, vol. 28(5), 2008, p. 483-490.

K. Yashiro et al., "Mass Transport Properties of $Ce_{0.9}Gd_{0.1}O_{2\text{-}0}$ at the Surface and in Bulk", Solid State Ionics, 152-153, 469 (2002).

Oberg K.E., "The Diffusivity and Solubility of Oxygen in Liquid Copper and Liquid Silver from Electrochemical Measurements", Metallurgical Transactions, vol. 4, 1973 p. 61-67.

Pal et al., "Solid-Oxide-Oxygen-Ion_Conducting Membrane (SOM) Technology for Green Synthesis of Metals from its Oxides," Magnesium Technology 2002, TMS (The Materials, Metals and Materials Society), p. 19-24.

S. Gopalan et al., "Hydrogen separation through the use of mixed oxygen ion and electron conducting membranes (I): theoretical analysis," International Journal of Hydrogen Energy, 29, 1623 (2004), pp. 1623-1629.

S. Hui et al., "Electrical Properties of Yttrium—Doped Strontium Titanate Under Reducing Conditions", J. Electrochem Soc., 149, pp. J1-J10 (2002).

S. Wang et al., "Electrocatalytic Properties of LSM-based Electrodes for Oxygen Reduction", J. Solid State Electrochemistry, vol. 6, 2002, p. 384-390.

S.P. Jiang et al., "The Electrochemical Performance of LSM/Zirconia-Yttria Interface as a Function of A-site Non-Stoichiometry and Cathodic Current Treatment", Solid State Ionics, vol. 121, 1999, p. 1-10.

T.A. Ramanarayanan et al., "The Diffusivity and Solubility of Oxygen in Liquid Tin and Solid Silver and the Diffusivity of Oxygen in Solid Nickel", Metallurgical Transactions, vol. 3, 1972, pp. 3239-3246.

Manning et al., "Zirconia-Based Inert Anodes for Green Electrosynthesis of Metals and Alloys," Proceedings of the Yazawa International Symposium on Metallurgical and Materials Processing, TMS Publication, 2003, p. 351-364.

V. Kharton et al., "Oxygen Transport in $Ce_{0.8}Gd_{0.2}O_{2\text{-}0}$ Based Composite Membranes", Solid State Ionics, 160, (2003) p. 247-258.

Wenquan Gong et al., "Cathodic Polarization Study on Doped Lanthanum Gallate Electrolyte Using Impedance Spectroscopy", Journal of Electroceramics, vol. 13, 2004, p. 653.

Wenquan Gong et al., "Polarization Study on Doped Lanthanum Gallate Electrolyte Using Impedance Spectroscopy", Journal of Materials Engineering and Performance, vol. 13, No. 3, Jun. 2004, p. 274-281.

Gong, W., "Materials System for Intermediate Temperature Solid Oxide Fuel Cells Based on Doped Lanthanum-Gallate Electrolyte," Ph.D. Thesis, 2005, Boston University, Boston, MA (158 pgs.).

* cited by examiner

WASTE TO HYDROGEN CONVERSION PROCESS AND RELATED APPARATUS

RELATED APPLICATIONS

This application is a divisional application of U.S. patent application Ser. No. 11/917,894, filed Oct. 21, 2008, which application is a national stage application of prior International Application No. PCT/US2006/023570, entitled "Waste To Hydrogen Conversion Process and Related Apparatus," filed Jun. 16, 2006, which claims the benefit of priority to application Ser. No. 60/691,007, filed on Jun. 16, 2005, entitled "Solid Oxygen Fuel Cell," the disclosure of which is incorporated herein in its entirety by reference.

International Application No. PCT/US2006/023570 also claims the benefit of priority to application Ser. No. 60/760,906, filed on Jan. 20, 2006, entitled "Waste To Hydrogen Generation Using Solid Oxide Membrane Technology," the disclosure of which is incorporated herein in its entirety by reference.

BACKGROUND

This invention relates to methods and systems for steam electrolysis. In particular, the invention relates to the conversion of waste materials into hydrogen. This invention further relates to reversible systems and methods for steam electrolysis and energy generation using solid oxide technology.

Steam reforming is a process that involves reaction of methane and/or other hydrocarbons with steam at temperatures between 700-1300K over a nickel catalyst on a ceramic substrate. The reaction results in producing primarily carbon monoxide and hydrogen with small amounts of residual hydrocarbons and impurity reaction byproducts such as oxides of sulfur and nitrogen. The primary reaction in the steam reforming process is:

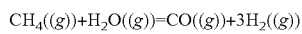

$$CH_4((g)) + H_2O((g)) = CO((g)) + 3H_2((g))$$

The traditional steam reforming process does not allow clean separation of hydrogen from carbon monoxide and the other impurity oxides that are generated in the process in a single step.

A higher purity hydrogen gas may be formed using steam electrolysis processes. In the electrolysis process hydrogen is generated by applying electrical energy to split water or steam. Typically two electrodes are used, hydrogen is generated at the cathode and oxygen at the anode. This process is energy intensive and expensive but can produce clean and pure hydrogen.

Mixed ionic and electronic conducting (MIEC) membranes have recently been considered for a wide variety of gas separation applications including oxygen separation, partial oxidation of methane, and hydrogen separation. In one example of this process, one side of an oxygen ion and electron conducting MIEC membrane is exposed to steam and the other side to a hydrocarbon such as methane. This sets up a chemical potential gradient in $O_2$ across which transport of oxygen occurs from the steam side to the hydrocarbon side leaving behind a $H_2$ rich product on the steam side and a product rich in synthesis gas (syn-gas) on the hydrocarbon side of the membrane. Hydrogen separation and purification using MIEC membranes are described in published PCT application WO 03/089117, which is incorporated in its entirety by reference. This process produces pure hydrogen and syn-gas from a source of steam and hydrocarbon fuel, however, additional processing is required to obtain the syn-gas used in this process.

Synthesis gas (syn-gas) is the name given to gases of varying composition that are generated in coal gasification and consists primarily of carbon monoxide and hydrogen. Syn-gas is typically prepared using a gasification process.

Gasification is a process that converts carbon-containing materials, such as coal, petroleum, petroleum coke or biomass, into carbon monoxide and hydrogen. In a gasifier, the carbonaceous material undergoes three processes, pyrolysis, combustion and gasification. During pyrolysis, the volatiles from the carbonaceous particle are removed by heating and the residue remaining forms the char. During combustion, the volatiles and some of the char react with oxygen to form carbon monoxide and carbon dioxide. This reaction also produces heat. During gasification, the char and carbon dioxide react with steam to produce carbon monoxide and hydrogen. Pyrolysis, combustion and gasification process releases large amounts of environmental pollutants that are present in coal including heavy metals and oxides of nitrogen, sulfur, hydrocarbon and carbon. Clean separation of hydrogen from other gases and impurities is a complex, difficult, and expensive process.

Another way to generate hydrogen is through incineration, which converts waste matter to other more acceptable forms of matter by heating it to a very high temperature (greater than thousand degrees centigrade). The process can decompose the waste matter or can selectively remove certain constituents in the matter by taking advantage of different boiling and flash points. In the incinerator the waste undergoes combustion reactions producing ash and combustion gases. The products of incineration are often further treated before release to meet regulatory standards for waste disposal. The incineration process is usually used as an alternative to landfilling and bioremediation, because it drastically reduces the volume of solid waste. The thermal energy released in the incinerator is often utilized in other processes. The waste incineration process however does not produce pure hydrogen and/or syn-gas. It does, however, serve to generate thermal energy that can be used in other processes, e.g., steam generation.

A fuel cell is an electrochemical device that converts the chemical energy in fuels (such as hydrogen, methane, butane or even gasoline and diesel) into electrical energy by exploiting the natural tendency of oxygen and hydrogen to react. Much development has focused on solid oxide fuel cells (SOFC), both because they are able to convert a wide variety of fuels into energy and because they do so with high efficiency. High efficiency and fuel adaptability are not the only advantages of solid oxide fuel cells. SOFCs are attractive as energy sources because they are clean, reliable, and almost entirely nonpolluting. Because there are no moving parts and the cells are therefore vibration-free, the noise pollution associated with power generation is also eliminated.

There is a great present and future need for pure hydrogen to power fuel cells for transportation, defense, and consumer electronic applications. There is also a large demand for syn-gas for stationary and distributed power generation. There remains an unmet need to generate efficient, low cost methods for generating high purity hydrogen.

SUMMARY OF THE INVENTION

In one aspect, the invention employs an oxygen-ion-conducting solid electrolyte at elevated temperatures with a novel system of electrodes to efficiently reduce steam at the cathode to form $H_2$-rich steam and oxidize a carbon feed containing hydrocarbons at the anode or convert hydrogen and oxygen into electrical energy.

Systems and embodiments of the invention provide pure hydrogen to power fuel cells for transportation, defense, and consumer electronic applications. Systems and embodiments of the invention also generate syn-gas, which is useful in a variety of applications, for example, in stationary and distributed power generation.

An aspect of the invention describes a method for converting a broad variety of waste materials to hydrogen gas using a specially designed oxygen-ion solid oxide membrane device. Waste materials, which can include hydrocarbon waste (plastics, polymers, paper, carbon and coal dust, etc), as well as toxic wastes such as cyanides, PCBs, etc., are introduced at over 1000K into a liquid metal electrode. The liquid metal/waste mixture consumes oxygen from steam that is passed over the membrane, converting the steam into hydrogen gas and the carbon feed into oxidation by-products, such as $CO$, $CO_2$, and the like. By introducing waste feed at the anode, the electrical energy needed to produce hydrogen from steam is greatly reduced over other known designs, while simultaneously converting waste materials to less harmful gaseous oxides of carbon.

In one or more embodiments, the cathode is a cermet, e.g., nickel-yttria-stabilized zirconia cermet, and the anode is a liquid metal such as liquid tin, copper, silver, etc. In one or more embodiments, the carbon feed can be introduced into the liquid metal anode in liquid or solid, e.g., powdered, form.

Hydrogen will be produced at the cathode and syn-gas (mixture of $CO(g)$ and $H_2(g)$) may be produced at the anode depending on the nature of waste feed used; a hydrocarbon waste feed is likely to produce syn-gas. The use of the liquid metal anode allows the waste feed to be efficiently decomposed and oxidized.

In another aspect of the invention, systems and methods are provided for reversible operation of a cell as a steam electrolyzer and as a solid oxide fuel cell. The cell is operated in the same temperature range in both processes. When operated as a steam electrolyzer, the cell generates $H_2$-entriched steam for use as a fuel in a fuel cell. As a solid oxide fuel cell, the cell produces electricity from hydrogen.

In one or more embodiments, the liquid metal electrode is silver. When operated as a fuel cell, the hydrogen will be passed over the electrode functioning as the anode and oxygen (air) will be bubbled through the liquid silver metal electrode functioning as the cathode. The use of liquid silver is advantageous since oxygen can dissolve in the liquid metal without oxidizing the metal (silver oxide is unstable above 1000K).

In one embodiment of the invention, hydrogen can be produced from steam through electrolysis when the cost of electricity is low (e.g., at night) and electricity can be produced back from hydrogen when the cost is high. This way the device does not have to undergo any thermal cycling.

The invention can be viewed as a technology that economically combines the beneficial effects of the incinerator, the oxygen-conducting solid membranes and the solid oxide fuel cell.

BRIEF DESCRIPTION OF THE DRAWING

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

In one or more embodiments, carbon-based reversible and regenerative solid oxide fuel cell system is provided that can be operated at zero to near zero pollution emission and within environmental hazard reduction goals. The device when operated as an electrolyzer can produce hydrogen at high throughputs from steam and carbon feed and the same device can be operated in the reverse mode as a fuel cell to produce electricity from hydrogen and air/oxygen.

Figure 1:
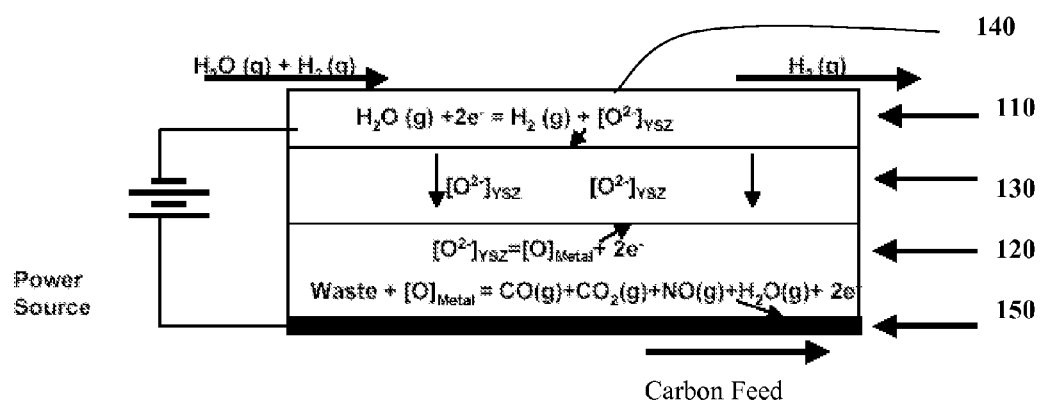
FIG. 1 is a schematic illustration of an electrolysis cell that provides waste conversion to hydrogen using solid oxide membrane technology.

Operation of the electrochemical device for synthesizing and separating hydrogen is shown in FIG. 1. The cell is constructed with two porous electrodes that sandwich an electrolyte. The device includes a cathode 110 that is capable of stably operating at high temperatures and a liquid metal anode 120, separated by a solid oxide electrolyte 130, e.g., an oxygen ion conducting membrane. The system further includes appropriate current collectors 140, 150 for the cathode and anode, respectively. This system, operating at a temperature between 1100-1900K, reacts a carbon feed with oxygen to form syn-gas (a mixture of $CO$ and $H_2$) on one side of the membrane and a hydrogen-rich steam mixture on the other side of the membrane. See, chemical reactions shown in FIG. 1. Oxygen diffuses across the membrane through coupled transport of oxygen ions and electrons/holes from the steam-rich side to the methane/reformate side until the chemical potential gradient of neutral $O_2$ across the membrane is dissipated. An electromotive force (EMF) is applied to drive the oxygen across the membrane. The requisite EMF can be reduced significantly by reacting the oxygen generated at the anode with oxidizable carbon.

Suitable solid oxide electrolytes are solid solutions (i.e., solid "electrolytes") formed between oxides containing divalent and trivalent cations such as alkaline earth oxides, e.g., calcium oxide, or rare earth oxides, e.g., scandium oxide, yttrium oxide, lanthanum oxide, etc., and oxides containing tetravalent cations such as zirconia, hafnia, thoria and ceria. The oxygen ion-conducting materials or phases may be an oxygen ion conductive mixed metal oxide having a fluorite structure. The oxygen ion conducting material may be a doped fluorite compound. The higher ionic conductivity is believed to be due to the existence of oxygen ion site vacancies. One oxygen ion vacancy occurs for each divalent or each two trivalent cations that are substituted for a tetravalent ion in the lattice.

Any of a large number of oxides such as rare earth doped zirconia-, ceria-, hafnia-, or thoria-based materials may be used as the solid oxide electrolyte. Some of the known solid oxide transfer materials include $Y_2O_3$-stabilized $ZrO_2$ (YSZ), $CaO$-stabilized $ZrO_2$, $Sc_2O_3$-stabilized $ZrO_2$, $Y_2O_3$-stabilized $CeO_2$, $CaO$-stabilized $CeO$, $GaO$-stabilized $CeO_2$, $ThO_2$, $Y_2O_3$-stabilized $ThO_2$, or $ThO_2$, $ZrO_2$, $CeO_2$, or $HfO_2$ stabilized by addition of any one of the lanthanide oxides or $CaO$. Additional examples include strontium- and magnesium-doped lanthanum gallate (LSGM). Many other oxides are known which have demonstrated oxygen ion-conducting ability, which could be used. The solid oxide electrolyte membrane used for hydrogen purification can be in any shape. One particularly convenient shape is tubular, with one end of the tube being closed. Another suitable shape is in the form of a flat sheet.

A liquid anode provides a medium for receiving the carbon feed and a large surface area interface between the anode and the carbon feed materials. Suitable anodes include non-consumable liquid metals having low vapor pressure (Vp), low melting point (Tm) and high solubility and diffusivity for oxygen. The anode also should also be compatible, i.e., inert, with the solid oxide membrane. Exemplary liquid metal anodes include liquid copper, tin, silver, and the like.

Suitable cathodes are inert solid electrodes, e.g., stable under reducing conditions and compatible with the solid oxide membrane. The cathode is desirably porous, to permit gas permeability from the steam side of the electrode to the solid oxide membrane. It should also be catalytic for electrochemical splitting of water, be stable to steam and have a high surface exchange coefficient in the range of $10^{-6}$ to $10^{-1}$ cm/s. Exemplary cathodes are cermets, such as nickel- or cobalt/yttria stabilized zirconia (Ni/Co—YSZ) cermet, Ni/ScSZ, cermet Co/ScSZ, composite of Y—SrTiO$_3$/YSZ, or composite of Y—SrTiO$_3$/ScSZ All of these electrodes are known to be compatible (stable) in contact with a YSZ electrolyte and to have low charge-transfer resistance.

Carbon feed-containing compounds of C, N, and H are introduced into the liquid metal electrode. In one or more embodiments, the carbon feed is a waste material such as hydrocarbon waste, e.g., plastics, polymers, paper, agricultural waste, saw dust, and the like, carbonaceous waste such as coal dust, carbon dust and the like, or toxic wastes such as cyanides, PCBs, etc. Any oxygen-absorbing, e.g., oxidizable, waste may be used.

In one or more embodiments, the carbon feed is introduced into the liquid metal anode as a powder or particulate form; in other embodiments, it is introduced into the liquid anode as a liquid. Typically the particle size of the feed is the range of a few microns to a few cm in diameter, convenient for continuous feeding. The liquid feed could be in the form of bio-stock.

In still other embodiments, the carbon feed is shaped into the form of a rod or sheet and is maintained in contact with the liquid metal anode. When the carbon feed is electronically conductive, as is the case for coal dust or carbon dust, the carbon feed may also serve as a consumable current collector. In one or more embodiments, the liquid metal anode may be housed in a vessel or tube, which also serves as the current collector. A suitable vessel includes a molybdenum tube, which also serves as the anode current collector.

In an exemplary embodiment, the system employs an oxygen-ion-conducting yttria-stabilized zirconia (YSZ) as the electrolyte, a silver liquid anode and a Ni—YSZ cermet cathode. Ni or its alloys can be used as a current collector for the cermet electrode (cathode) and a molybdenum tube can be used as the current collector for the liquid metal electrode (anode). The current collectors have high electronic conductivity and are stable (non-reactive) in the respective environments.

While operating the device as an electrolyzer (FIG. 1), steam-rich feed (e.g., 97% steam and 3% H$_2$) is introduced over the Ni—YSZ cermet electrode functioning as cathode; 3% H$_2$ in the gas mix will prevent Ni oxidation. The operation of the device is at elevated temperatures (900-1000° C.) and most of this heat is provided externally by the resistive heating from the electrical current. Some of this heat will also be provided by burning part of the feedstock in a combustion plenum outside the cell. The process is conducted at a net pressure of 1 atm. In operation, steam is reduced at the cathode (Ni—YSZ cermet) producing hydrogen and oxygen ions.

The oxygen ions migrate through the solid YSZ electrolyte towards the liquid-metal anode. At the YSZ/liquid metal interface, the oxygen ions oxidize (lose electrons) and dissolve in the liquid metal as neutral oxygen atoms ([O]). The waste feed (e.g. saw dust, plastics, agricultural waste, etc.) depending on its composition will dissociate into its constituents elements (C, N, H, etc.) in the liquid metal and oxidize the dissolved neutral oxygen atoms that enter the metal. The applied electrical potential through the current collectors will depend on the resistive and polarization losses in the electrolyzer, the desired rate of hydrogen production and the corresponding rate of waste feed. Applied electrical potential can be increased as long as the concentration polarization at the electrodes does not induce electronic conduction in the electrolyte. Based on the information available on electrochemical performance of Ni—YSZ cermet electrodes and liquid metal anodes (copper, tin and silver) in contact with YSZ electrolytes, it is expected that ionic current densities on the order of 1 A/cm$^2$ (or 7 cc/cm$^2$-min. of H$_2$(g)) can be achieved in an electrolyzer cell according to one or more embodiments of the invention. By having the waste feed, the electrical energy needed to produce hydrogen from the steam feed will be greatly reduced.

In the waste feed electrolyzer, the following reactions will occur:

At the cathode:

$$H_2O(g)+2e^-(Ni) \rightarrow H_2(g)+O^{2-}(YSZ) \qquad (1)$$

At the anode:

$$O^{2-}(YSZ) \rightarrow \underline{O}(Metal)+2e^-(Metal) \qquad (2)$$

Waste Feed in Liquid Metal: $(C_aH_bN_cS_d) \rightarrow a\underline{C}+b\underline{H}+c\underline{N}+d\underline{S}$ The oxygen that dissolves in the metal at the YSZ/metal interface gets transported through the molten metal and reacts with the carbon and other elements to form oxygen-containing compounds according to the following reactions:

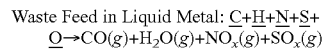

Or

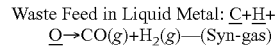

Depending on the nature of the waste feed it can either be converted to syn-gas (mixture of CO(g) and H$_2$(g)) or gaseous oxides of carbon, hydrogen, nitrogen, sulfur, etc., that can be treated with existing scrubbing technologies before releasing it to the environment. The proposed process can be altered to include a water-gas shift reactor (CO)(g)+H$_2$O(g)$\rightarrow$CO$_2$(g)+H$_2$(g)) to generate additional hydrogen from some of the CO(g) and the excess steam that exits the electrolyzer. The additional heat generated from combustion may be used to heat the steam used in steam electrolysis or for other thermal processes.

It has been surprisingly established that the steam electrolysis system that provides efficient generation of pure hydrogen from steam and low cost carbon feed can be reversibly operated under similar conditions as a solid oxide fuel cell (SOFC). The proposed reversible-and-regenerative SOFC process shown in FIG. 2 can operate using essentially the same device as is used for the steam electrolysis exemplified in FIG. 1. The system employs oxygen-ion-conducting yttria-stabilized zirconia (YSZ) as solid electrolyte 230, and the electrodes are silver 210 and nickel-yttria stabilized zirconia (Ni—YSZ) cermet 220. In the SOFC, the polarities of the electrodes are reversed, so that the liquid metal acts as the cathode and the cermet electrode acts as an anode.

Air or oxygen flows along the cathode (the liquid metal), which diffuses into the liquid metal electrode. When an oxygen molecule contacts the cathode/electrolyte interface, it catalytically acquires electrons from the cathode and splits into two oxygen ions. The oxygen ions diffuse into the electrolyte material and migrate to the other side of the cell where they encounter the anode (the cermet). The oxygen ions encounter the hydrogen that is flowing over the porous anode at the anode/electrolyte interface and react catalytically, giving off water, heat, and—most importantly—electrons. The electrons transport through the anode to the external circuit and back to the cathode, providing a source of useful electrical energy in an external circuit.

Figure 2:
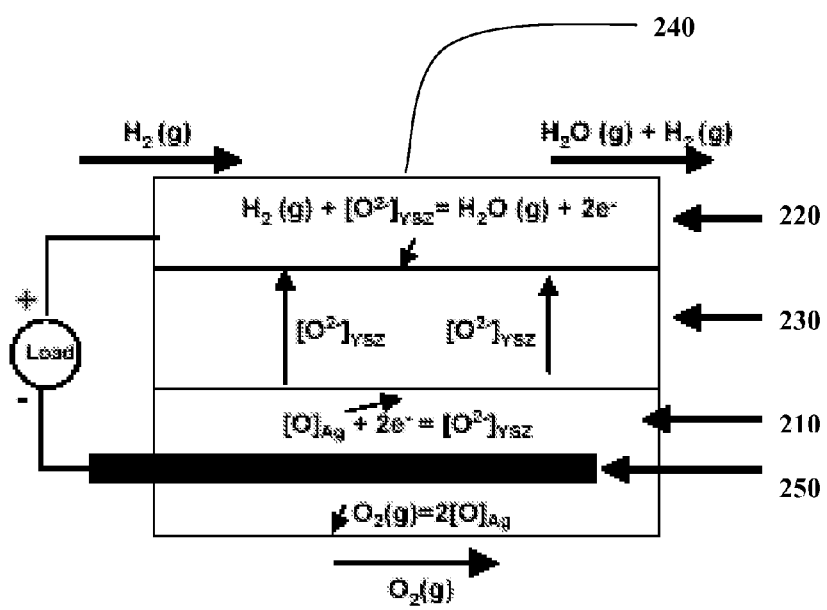
FIG. 2 is a schematic illustration of a fuel cell running on hydrogen and oxygen.

The operating temperature of the device while running as a solid oxide fuel cell is expected to be greater than 1000K, e.g., about 1100-1900K. Silver at this temperature will be in the molten state. Although it is an expensive material, the reason for employing silver as one of the electrodes is that it has negligible solubility for carbon, high solubility and diffusivity for oxygen, does not self-oxidize at these temperatures, and is non-consumable. This set of unique properties will allow silver to function as an anode in the electrolyzer (FIG. 1) and as a cathode in the fuel cell (FIG. 2). While operating the device as a fuel cell 200 (FIG. 2), air is bubbled into the silver cathode 210 through a refractory (alumina) tube (not shown) (in contrast to steam electrolysis where carbon is fed into the molten anode). Oxygen dissolves in the molten silver ([O]) and participates in the cathodic reaction at the YSZ/molten silver interface to generate the oxygen ions. Hydrogen-rich feed is introduced over the Ni—YSZ cermet electrode 220 (anode) and current collector 240 to oxidize the oxygen ions migrating through the YSZ electrolyte. Sintered rods of strontium-doped lanthanum manganite ($La_{1-x}Sr_xMnO_3$, LSM) or strontium and cobalt doped lanthanum ferrite ($La_{1-x}Sr_xCo_yFe_{1-y}O_3$, LSCF) dip into the molten silver (functioning as the cathode) to serve as current collector 250. During operation of the device as an SOFC, the oxygen partial pressure at the cathode will be high enough that it prevents the use of any metal as the current collector. LSM and LSCF have both been demonstrated to be excellent cathode materials (electronic conductors) in SOFCs and laboratory tests indicate that they are stable in contact with silver. Ni or its alloys can serve as the current collector for the Ni—YSZ cermet electrode, as it does in steam electrolysis.

A difference between the proposed solid oxide fuel cell (SOFC) according to one or more embodiments of the invention and state of the art solid oxide fuel cells based on yttria-stabilized zirconia electrolyte is the choice of the cathode material. An SOFC according to one or more embodiments of the invention uses liquid silver as the cathode, whereas state of the art SOFCs employ inert solid electrodes, such as Sr-doped lanthanum manganite (LSM), as the cathode. Liquid silver provides a larger interfacial area with the YSZ electrolyte for the charge-transfer reaction compared to the LSM/YSZ interfacial area in the state of the art tubular SOFCs. Furthermore, the electronic conductivity of silver is much larger compared to LSM and the oxygen diffusivity in silver is also relatively high. As a result, it is expected that polarization losses at the cathode in the proposed SOFC will be lower than the state of the art tubular SOFCs. It is believed that the SOFC architecture (device) according to one or more embodiments of the invention will have a better performance compared to the state of the art SOFCs and therefore the efficiencies envisioned are expected to be higher.

In one or more embodiments of the invention, during off-peak periods, the proposed electrochemical device can be employed for producing hydrogen from waste feed and steam through electrolysis and during peak periods the same structure can be used as a fuel cell to generate electricity from hydrogen. The device can thus work continuously alternating between these two modes as required and will not need to be shut down or thermally cycled. The process provides an alternative to coal gasification of the generation of syn-gas that is particularly attractive for economic and environmental reasons. The CO(g) generated while operating the device as an electrolyzer can be combusted with oxygen to recover the heat for steam generation. The combustion product $CO_2(g)$ can be permanently sequestered in geological formations. Candidate reservoirs include depleted oil and gas reservoir, unminable coal seams, deep saline aquifers and basalt-formations.

It is to be noted that the device when operating as an electrolyzer or as a solid oxide fuel cell will be operated such that the joule heating produced by the current flow will be sufficient to maintain the device at its operating temperature.

Figures 3A, 3B:
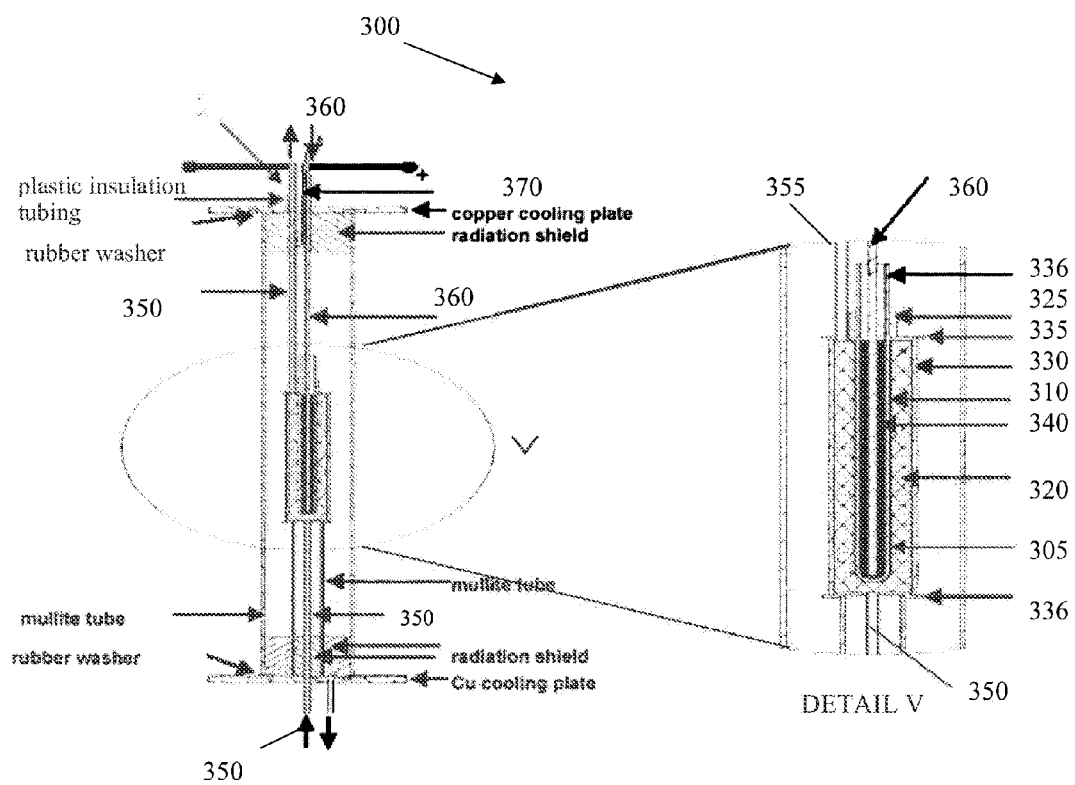
FIG. 3A is a schematic illustration of the experimental set-up for demonstrating concept of waste conversion to hydrogen using solid oxide membrane technology, and including an expanded view (FIG. 3B) of the electrolysis cell/fuel cell.

An exemplary reversible device 300 is shown in FIG. 3. For ease of fabrication and demonstration, a one-end-closed YSZ tube 305 (20 cm. long, 1.5 cm. internal diameter and 1.5 mm. thick) is used as the cell support structure. A Ni—YSZ cermet cathode 310 is slurry coated on the outer surface of the YSZ tube 305. Ni fiber mesh 320 is wrapped over the sintered Ni—YSZ coating 310 on the YSZ tube 305 and inserted into a both-end open Ni tube 330 (with Ni end caps 335, 336. A spacer 325 (or other similar element) positions the components within the device and prevents contact. Good contact is ensured between the Ni tube 330 and the Ni-fiber mesh 320 to minimize contact resistance. The Ni tube 330 carries current to and from the Ni—YSZ cermet electrode 310. The interior of one-end closed YSZ tube 305 holds a liquid metal (tin/silver) anode 340.

The device can be operated as an electrolyzer at temperatures of about 1000° C. (1273K) by providing a steam-rich feed (97% steam and 3% hydrogen) through one end of inlet 350. An external power source (not shown) is employed to reduce the steam over the Ni—YSZ cermet cathode 310 as it exits the other end of the Ni tube 330 at outlet 355 and oxygen ions will be transported through the YSZ tube to the molten metal electrode interface. The oxygen ions will undergo anodic reaction and dissolve in molten metal. Waste feed can be continuously fed into the molten tin/silver at inlet 360 to consume the dissolved oxygen. The products of the reaction will thus be $CO/H_2/CO_2/H_2O$ on the liquid metal side and primarily hydrogen on the steam side; the residual steam will be condensed. A molybdenum or a stainless steel rod 370 can be used as the current collector.

The same device can operate as a fuel cell with liquid silver functioning as the cathode inside the one-end closed yttria-stabilized zirconia tube. Oxygen is bubbled into the silver through inlet 360 and hydrogen will be passed over the nickel-yttria-stabilized zirconia cermet electrode functioning as the anode at inlet 350. Reaction by products ($H_2O/H_2$) exit the system from outlet 355. Ni contact rod 380 serves as a current collector for the anode and a sintered rod of strontium-doped lanthanum manganite ($La_{1-x}Sr_xMnO_3$) or strontium and cobalt doped lanthanum ferrite ($La_{1-x}Sr_xCo_yFe_{1-y}O_3$) (not shown) is introduced into the molten silver to serve as a current collector for the cathode. The electrochemical performance of the cell can be evaluated by determining the I-V characteristics of the cell.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A steam electrolysis system, comprising:
an oxidizing compartment comprising a liquid metal anode and a reducing compartment comprising a cathode, said oxidizing and reducing compartments separated by an oxygen ion conducting solid electrolyte;
a conduit for directing steam across the cathode in the reducing compartment; and
a conduit for contacting a carbon feed with the liquid metal anode in the oxidizing compartment.

2. The electrolysis system of claim 1, further comprising: a condenser downstream from the oxidizing compartment for separating steam from hydrogen.

3. The electrolysis system of claim 1, wherein the liquid metal anode comprises a metal that is liquid at temperatures greater than 1000K.

4. The electrolysis system of claim 3, wherein the liquid metal anode is selected from the group consisting of silver, copper and tin.

5. The electrolysis system of claim 4, wherein the cathode comprises a cermet.

6. The electrolysis system of claim 5, wherein the cathode is porous.

7. The electrolysis system of claim 4, wherein the oxygen ion-conducting solid electrolyte is selected from the group consisting of rare earth doped zirconia-, ceria-, hafnia-, and thoria-based oxides.

8. The electrolysis system of claim 7, wherein the electrolyte comprises yttria-stabilized zirconia.

9. The electrolysis cell of claim 1, wherein the carbon feed is conductive and is in contact with the anode as a consumable current collector.

10. A reversible system, comprising:
a first electrode comprising liquid silver metal and a second electrode, said first and second electrodes separated by a oxygen ion-conducting solid electrolyte;
a conduit for directing a first reactive material across the second electrode; and
a conduit for contacting a second reactive material with the first liquid silver electrode, wherein the cell is capable of steam electrolysis when the polarity of the electrodes is selected such that the liquid silver is an anode and the cell is capable of electrical energy generation when the polarity of the electrodes is selected such that the liquid silver is a cathode.

11. The reversible system of claim 10, wherein the second electrode comprises a cermet.

12. The reversible system of claim 11, wherein the second electrode is porous.

13. The reversible system of claim 10, wherein the oxygen ion-conducting solid electrolyte is selected from the group consisting of rare earth doped zirconia-, ceria-, hafnia-, and thoria-based oxides.

14. The reversible system of claim 13, wherein the electrolyte comprises yttria-stabilized zirconia.

15. The reversible system of claim 10, wherein the polarity of the system is selected such that the liquid silver electrode is an anode and the second reactive materials is carbon feed.

16. The reversible system of claim 15, wherein the carbon feed is conductive and is in contact with the anode as a consumable current collector.

17. The reversible system of claim 15, wherein the carbon feed comprises carbon-containing waste material.

18. The reversible system of claim 17, wherein the waste material is selected from the group consisting of hydrocarbon waste, agricultural waste, carbonaceous waste and toxic waste.

19. The reversible system of claim 17, wherein the waste material is selected from the group consisting of plastics, polymers, paper, saw dust, carbon and coal dust.

20. The reversible system of claim 15, wherein the carbon feed is introduced into the liquid metal anode as a liquid.

21. The reversible system of claim 15, wherein the carbon feed is introduced into the liquid metal anode as a powder.

* * * * *